US009233328B2

(12) United States Patent
Wuebbeling et al.

(10) Patent No.: US 9,233,328 B2
(45) Date of Patent: Jan. 12, 2016

(54) CYCLONE SEPARATOR

(71) Applicant: MANN+HUMMEL GMBH, Ludwigsburg (DE)

(72) Inventors: Martin Wuebbeling, Mannheim (DE); Manfred Winter, Bad Rappenau (DE)

( * ) Notice: Subject to any disclaimer, the term of this patent is extended or adjusted under 35 U.S.C. 154(b) by 0 days.

(21) Appl. No.: 14/054,122

(22) Filed: Oct. 15, 2013

(65) Prior Publication Data
US 2014/0373490 A1    Dec. 25, 2014

(30) Foreign Application Priority Data

Oct. 15, 2012   (DE) .......................... 10 2012 020 134

(51) Int. Cl.
| B01D 45/12 | (2006.01) |
| B01D 45/16 | (2006.01) |
| B04C 3/04 | (2006.01) |
| F02M 35/022 | (2006.01) |
| B01D 45/08 | (2006.01) |
| B01D 50/00 | (2006.01) |
| B04C 3/06 | (2006.01) |

(52) U.S. Cl.
CPC ............... *B01D 45/16* (2013.01); *B01D 45/08* (2013.01); *B01D 45/12* (2013.01); *B01D 50/002* (2013.01); *B04C 3/04* (2013.01); *B04C 3/06* (2013.01); *F02M 35/0223* (2013.01)

(58) Field of Classification Search
CPC ............ B01D 45/16; B04C 3/06; B04C 3/04; F02M 35/0223

USPC ........ 55/337, 459.1, 447, 462, 456, 457, 346, 55/347
See application file for complete search history.

(56) References Cited

U.S. PATENT DOCUMENTS

| 2,553,175 | A | * | 5/1951 | Davenport | ................ B04C 5/24 55/343 |
| 2,762,450 | A | | 9/1956 | Westlin | |
| 3,915,679 | A | * | 10/1975 | Roach et al. | ..................... 55/347 |
| 6,835,222 | B2 | * | 12/2004 | Gammack | ............. A47L 9/1625 55/345 |

(Continued)

FOREIGN PATENT DOCUMENTS

| DE | 102008011186 A1 | 9/2009 |
| DE | 102010014278 A1 | 10/2011 |

*Primary Examiner* — Dung H Bui
(74) *Attorney, Agent, or Firm* — James Hasselbeck

(57) ABSTRACT

A cyclone separator has a cyclone arrangement with individual cyclones each provided with a cell tube and guide device. The guide device causes a gas stream passing through the cell tube to rotate. At least one particle discharge is positioned perpendicularly to a longitudinal axis of the cyclone separator and discharges separated particles that have been separated from the gas stream in the cyclone arrangement. The cell tubes, for a targeted discharge of the separated particles, each have at least one particle outlet opening that is facing the particle discharge. The particle outlet openings of at least some of the individual cyclones, neighboring each other in the direction of a first perpendicular line that is perpendicular relative to the longitudinal axis of the cyclone separator, are displaced relative to each other in the direction of the longitudinal axis of the cyclone separator.

12 Claims, 10 Drawing Sheets

(56) References Cited

U.S. PATENT DOCUMENTS

| | | | | |
|---|---|---|---|---|
| 7,828,866 B2* | 11/2010 | Courtney | A47L 9/1625 | 55/343 |
| 8,152,878 B2* | 4/2012 | McLeod | A47L 9/1625 | 15/347 |
| 8,262,761 B2* | 9/2012 | Babb et al. | | 55/346 |
| 8,562,705 B2* | 10/2013 | Courtney | A47L 9/1625 | 55/343 |
| 2007/0079583 A1* | 4/2007 | Oh | A47L 9/1608 | 55/345 |
| 2007/0294856 A1* | 12/2007 | Park | A47L 5/28 | 15/347 |
| 2008/0289140 A1* | 11/2008 | Courtney | A47L 9/1625 | 15/353 |
| 2010/0313533 A1 | 12/2010 | Muenkel | | |
| 2013/0031878 A1 | 2/2013 | Menssen | | |
| 2013/0152525 A1* | 6/2013 | Brandner et al. | | 55/447 |

* cited by examiner

CYCLONE SEPARATOR

CROSS REFERENCE TO RELATED APPLICATIONS

This application claims the benefit under 35 USC 119 of German patent application DE 102012020134.6 filed Oct. 15, 2012, the above German patent application is hereby incorporated by reference in its entirety.

BACKGROUND OF THE INVENTION

The invention concerns a cyclone separator for separating liquid and/or solid particles from a gas stream. The cyclone separator comprises a plurality of individual cyclones that, for separating the particles from the gas stream, each have a cell tube with a guide device wherein the guide device is designed to cause the gas stream to rotate. The cyclone separator further comprises a particle discharge for discharging the separated particles from the cyclone arrangement, wherein the particle discharge is arranged perpendicularly to the longitudinal axis of the cyclone separator. For a targeted discharge toward the particle discharge of the particles that have been separated by rotation, the cell tubes each have at least one particle outlet opening that is facing the particle discharge.

A cyclone separator embodied as a multi-cell cyclone that is serving as a pre-separator for an air filter is disclosed, for example, in the publications DE 10 2010 014 278 A1 and DE 10 2008 011 186 A1.

Moreover, an air filter with a pre-separator configured as a multi-cell cyclone is disclosed in the publication WO 2009/106591 A2. In this known air filter an outflow geometry of the pre-separator is matched to the inflow geometry of the filter element. This can be realized by an appropriate distribution of the individual cyclones along the circumference of the pre-separator but also by an appropriate orientation of the cyclone outlets. In this connection, the entire cyclones, or only their outlets, can be positioned at a slant.

These known cyclone separators have the problem that the separated particles of neighboring individual cyclones can meet each other and accumulate in the cyclone separator (or the cyclone block) instead of being discharged or let out through the particle discharge. This is in particular a problem in cyclone separators in which the particles are not additionally removed by suction. These particle accumulations in the cyclone separator can cause clogging of individual particle outlet openings and therefore diminish the pre-separation degree of the cyclone separator.

SUMMARY OF THE INVENTION

Based on the afore described disadvantages and weaknesses and by taking into account the above discussed prior art, the present invention has the object to further develop a cyclone separator of the aforementioned kind such that the discharge of the particles that have been separated by rotation is improved.

In accordance with the present invention, this is achieved in that the particle outlet openings of at least some of the individual cyclones neighboring each other in the direction of a first perpendicular line relative to the longitudinal axis of the cyclone separator, for example, the individual cyclones that are arranged on top of each other in the vertical direction of the cyclone arrangement, are staggered (offset) relative to each other in the direction of the longitudinal axis of the cyclone separator.

Advantageous configurations and expedient further developments of the present invention are characterized in the dependent claims.

Accordingly, the present invention is based on the particle outlet openings as well as, optionally, the downstream ends of at least some of the individual cyclones that, in the direction of a first perpendicular line (Y) relative to the longitudinal axis (X) of the cyclone separator, are neighboring each other, in particular the individual cyclones that in the vertical direction of the cyclone arrangement are arranged on top of each other, for example, the individual cyclones that in the fall direction of the separated particles are arranged on top of each other, are displaced relative to each other or staggered (offset) relative to each other in the direction of the longitudinal axis of the cyclone separator. The discharge paths of the separated particles of the respective particle outlet openings of the cell tubes toward the particle discharge of the cyclone separator that is facing these particle outlet openings are thus at least partially offset or staggered, in particular axially offset, relative to each other.

The individual cyclones are preferably embodied as inline cyclone cells in which the flow is substantially axial. By means of a guide device arranged upstream, a spiral flow is generated in the interior of a (cyclone) cell tube; particles are transported to the exterior by centrifugal force; and, subsequently, the purified air exits from the inline cyclone cell through an immersion tube that is projecting at the downstream side into the cell tube.

The displacement or offset of the particle outlet openings relative to each other in accordance with the invention has the effect that the particles that are separated by the individual cyclones with offset particle outlet openings are guided to different planes. Particles that are separated by individual cyclones with offset particle outlet openings therefore will not meet each other and are reliably removed from the cyclone separator. Because of the displacement (offset) of the particle outlet openings, an accumulation of the separated particles that are exiting from the particle outlet openings is avoided or at least reduced in the cyclone separator. In contrast to the prior art in which the particle outlet openings and the downstream ends of the cell tubes are all arranged in a plane that is perpendicular to the longitudinal axis of the cyclone separator, i.e., are all arranged in the fall direction of the separated particles, in the inventive cyclone separator the separated particles are significantly more effectively removed from the cyclone arrangement and discharged from the cyclone separator. A person of skill in the art will appreciate this in particular in case of cyclone separators in which the separated particles are not additionally removed by suction.

In a cyclone separator that is configured as a pre-separator, by means of the axial displacement or offset of the particle outlet openings according to the invention, the degree of pre-separation is significantly increased and/or is maintained over the service life of the device in comparison to the prior art.

According to an advantageous embodiment of the invention, the axial offset, i.e., the offset in the direction of the longitudinal axis of the cell tubes, of the particle outlet openings can be realized in two planes or in two directions (Y, Z) that are angularly positioned relative to each other and also to the longitudinal axis (X) of the cyclone separator. In this connection, the particle outlet openings of at least some of the individual cyclones, neighboring each other in the direction of a second perpendicular line (Z) that is perpendicular to the longitudinal axis (X) of the cyclone separator as well as perpendicular to the first perpendicular line (Y), are displaced or offset relative to each other in the direction of the longitudinal axis (X) of the cyclone separator. Advantageously, neighboring individual cyclones that are arranged, for example, in the vertical direction of the cyclone arrangement and neighboring individual cyclones that are arranged in the transverse direction of the cyclone arrangement, i.e., individual cyclones that are positioned on top of each other as well as individual cyclones arranged adjacent to each other horizontally, can be displaced or offset to each other in the direction of the longitudinal axis (X) of the cyclone separator.

The displacement of the particle outlet openings of the individual cyclones that are neighboring each other in the direction of the second perpendicular line (Z) has the effect that those particles that are separated from these individual cyclones will not meet but will be guided into different planes. The offset of the particle outlet openings in two planes has thus the advantage that accumulations of the separated particles are prevented in the horizontal position as well as in the vertical position of the cyclone separator.

The displacement (offset) of the particle outlet openings in the direction of the longitudinal axis (X) of the cyclone separator, i.e., the displacement of the particle outlet openings of the individual cyclones that are neighboring each other in the direction of the first perpendicular line (Y) and/or the displacement of the particle outlet openings of the individual cyclones that are neighboring each other in the direction of the second perpendicular line (Z) can be realized according to an advantageous embodiment of the present invention by a slanted positioning of the longitudinal axis of the cell tubes relative to the longitudinal axis (X) of the cyclone separator.

The longitudinal axis of the cell tubes can be arranged also parallel to the longitudinal axis of the cyclone separator. In this case, the displacement of the particle outlet openings in the direction of the longitudinal axis (X) of the cyclone separator can be realized by a displacement of the particle outlet openings in the direction of the longitudinal axis of the cell tubes. The displacement or offset of the particle outlet openings in the direction of the longitudinal axis of the cell tubes can be realized, for example, by a different length of the cell tubes or, preferably, by an axial displacement of the individual cell tubes relative to each other, i.e., a cyclone cell displacement (offset). In this case, the downstream ends of the cell tubes of at least some of the individual cyclones that are neighboring each other in the direction of the first perpendicular line (Y) perpendicular relative to the longitudinal axis (X) of the cyclone separator and/or are neighboring each other in the direction of the second perpendicular line (Z) perpendicular relative to the longitudinal axis (X) of the cyclone separator are displaced also axially, i.e., in the direction of the longitudinal axis (X) of the cyclone separator or in the direction of the longitudinal axis of the cell tubes.

According to a further advantageous embodiment, the guide devices or guide vanes of at least some of the cell tubes can be displaced axially in the flow direction.

Independent thereof or in combination therewith, the magnitude of the offset of the particle outlet openings in the direction of the longitudinal axis (X) of the cyclone separator can be selected as a function of the number of individual cyclones neighboring each other, i.e., the number of the horizontally adjacently positioned individual cyclones or the number of the individual cyclones arranged on top of each other, and/or of the distance of the particle outlet opening to the particle discharge that the particle outlet opening is facing.

Advantageously, the offset is the greater the more individual cyclones neighboring each other along the respective perpendicular line, i.e., on top of each other or horizontally neighboring each other. According to an advantageous embodiment of the present invention, the angle between the connecting line of the offset particle outlet openings and the first perpendicular line (Y) and/or the second perpendicular line (Z) is selected as a function of the number of the individual cyclones that are neighboring each other along the first perpendicular line or the second perpendicular line. In this connection, the connecting line of the dust outlet openings arranged displaced relative to each other can be at least one straight line. The particle outlet openings can thus be arranged on at least one reference plane that is slanted relative to the first perpendicular line (Y), to the second perpendicular line (Z), and to the longitudinal axis (X) of the cyclone separator.

According to an advantageous embodiment of the present invention, the degree or the magnitude of the axial displacement of the particle outlet openings can thus be depending on the number of the individual cyclones that are arranged on an imaginary line from the area facing away from the particle discharge to the area opposite to this area of the cyclone separator. In this connection, the displacement of the particle outlet openings is preferably the greater the more individual cyclones are positioned adjacent to each other and, in particular, positioned on top of each other in the direction of the force of gravity.

Alternatively, the displacement of the particle outlet openings in the direction of the longitudinal axis (X) of the cyclone separator, i.e., the displacement of the particle outlet openings of the individual cyclones neighboring each other in the direction of the first perpendicular line (Y) and/or of the particle outlet openings of the individual cyclones that in the direction of the second perpendicular line (Z) are positioned adjacent to each other, can decrease with increasing distance of the particle outlet opening to the particle discharge that the particle outlet opening is facing. In this case, the connecting line of the particle outlet openings that are displaced relative to each other is not a straight line but a curved line. The particle outlet openings that are displaced relative to each other are thus arranged spherically.

Independent thereof or in connection therewith, the displacement of the particle outlet openings of the individual cyclones that are neighboring each other in the direction of the first perpendicular line (Y) and/or the displacement of the particle outlet openings of the individual cyclones that are neighboring each other in the direction of the second perpendicular line (Z) can be realized alternatingly. For example, the particle outlet opening of every other individual cyclone of the individual cyclones neighboring each other can be displaced in the direction of the longitudinal axis of the cyclone separator. This is in particular advantageous for large cyclone separators in which there are very many individual cyclones neighboring each other because the cyclone separator, as a result of the alternating displacement, can still be designed to have a compact configuration. In comparison to a cyclone separator in which all neighboring particle outlet openings, for example, all those that are positioned on top of each other and/or all those horizontally adjacent to each other, are axially displaced relative to each other, space is saved in the direction of the longitudinal axis of the cyclone separator by such an alternating displacement.

Moreover, for saving space in the direction of the longitudinal axis of the cyclone separator, it is possible to arrange only some of the particle outlet openings in the direction of the longitudinal axis (X) of the cyclone separator with displacement (offset). For example, only half or only one third of the particle outlet openings, for example, only those particle outlet openings arranged in the area of the particle discharge, can be arranged with displacement.

Independent thereof or in connection therewith, for saving space in the direction of the longitudinal axis of the cyclone separator, the individual cyclones, in particular the cell tubes, can be associated with at least two segments wherein the cyclone cells can be arranged within a segment along a reference surface, for example, along a reference plane or along a spherical reference surface. The reference surfaces can be parallel displaced or can be arranged mirror-symmetrical relative to each other.

According to a further advantageous embodiment of the present invention, the cell tubes and optionally the particle discharge are associated with a first cyclone component, in particular a cyclone top.

According to an advantageous embodiment, a second cyclone component follows in the flow direction of the gas stream. In particular, this second cyclone component is the cyclone bottom part provided with a plurality of immersion tubes. The immersion tubes have at their ends downstream in the flow direction of the gas stream a central outlet for discharging the purified gas stream, in particular into a common collecting chamber. Moreover, the immersion tubes are designed to be received in the cell tubes and to be connected at least partially with their ends arranged downstream in the respective flow direction of the gas stream to the downstream ends of the cell tubes arranged downstream in the flow direction of the gas stream, respectively.

The immersion tubes, in particular the bases of the immersion tubes, can have the same length, respectively. In case of an axial displacement of the downstream ends of the cell tubes, the central outlets of the immersion tubes are then also positioned with axial displacement relative to each other.

Alternatively, the length of the immersion tubes can be matched to the axial displacement of the cell tubes so that the central outlets of the immersion tubes are arranged at a plane that is positioned perpendicular to the longitudinal direction of the cell tubes or parallel to the fall direction of the separated particles.

The present invention concerns moreover the use of a cyclone separator of the invention as a pre-separator of an air filter system for a compressed air compressor or an internal combustion engine for a vehicle, in particular for an agricultural machine, for example, for a tractor, or for a truck. Particularly in the field of internal combustion engines for vehicles, the configuration of an efficiency-optimized and space-optimized air filter system is mandatory in order to keep the dimensions small and to still provide, on the other hand, a highly efficient air filter arrangement.

BRIEF DESCRIPTION OF THE DRAWING

As already discussed above, there are various possibilities for implementing and developing the teachings of the present invention in advantageous ways. Reference is being had in this context to the dependent claims. Also, in the following embodiments and variants of the invention and features and advantages of the invention will be explained in more detail, inter alia with the exemplary embodiment illustrated in the drawings.

Same or similar configurations, elements or features are identified in FIGS. 1 through 25 with identical reference characters.

DESCRIPTION OF THE PREFERRED EMBODIMENTS

Figure 24:
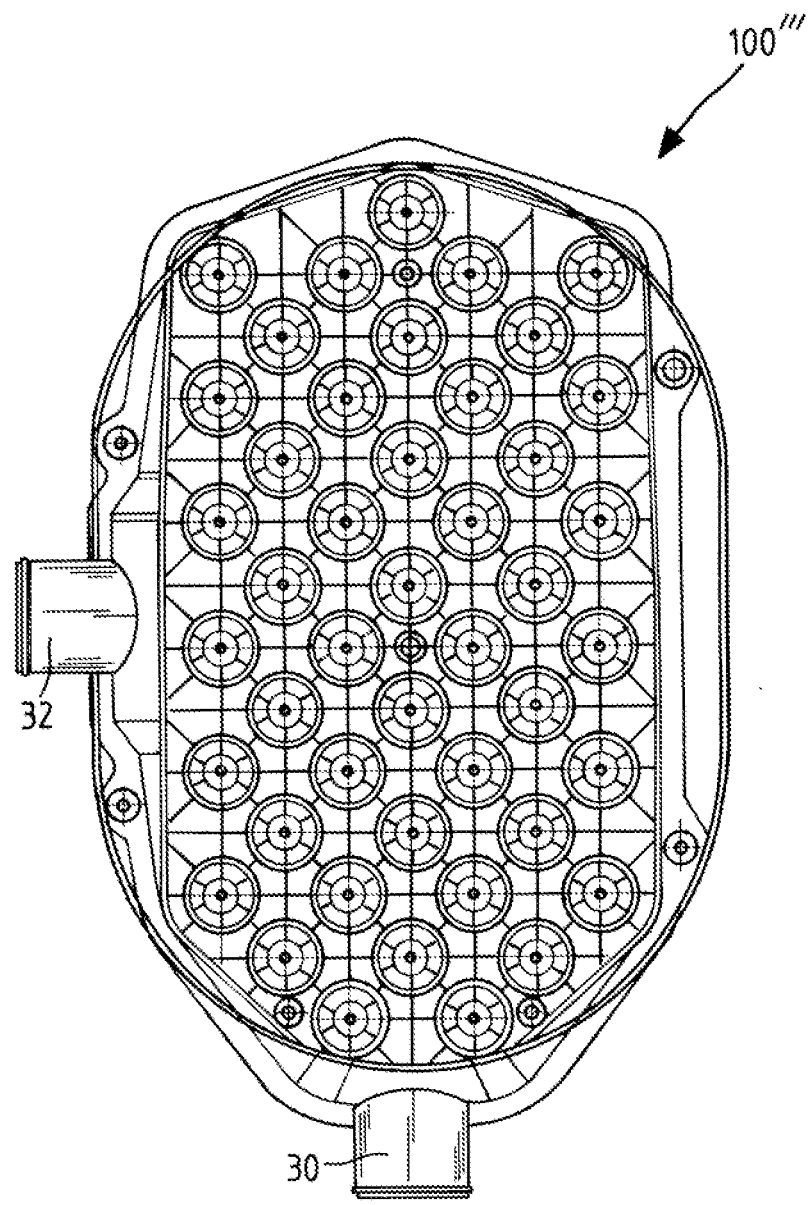
FIG. 24 is a front view of a fourth embodiment of a cyclone separator according to the present invention wherein this cyclone separator has two possible positions for a particle discharge.
Figure 25:
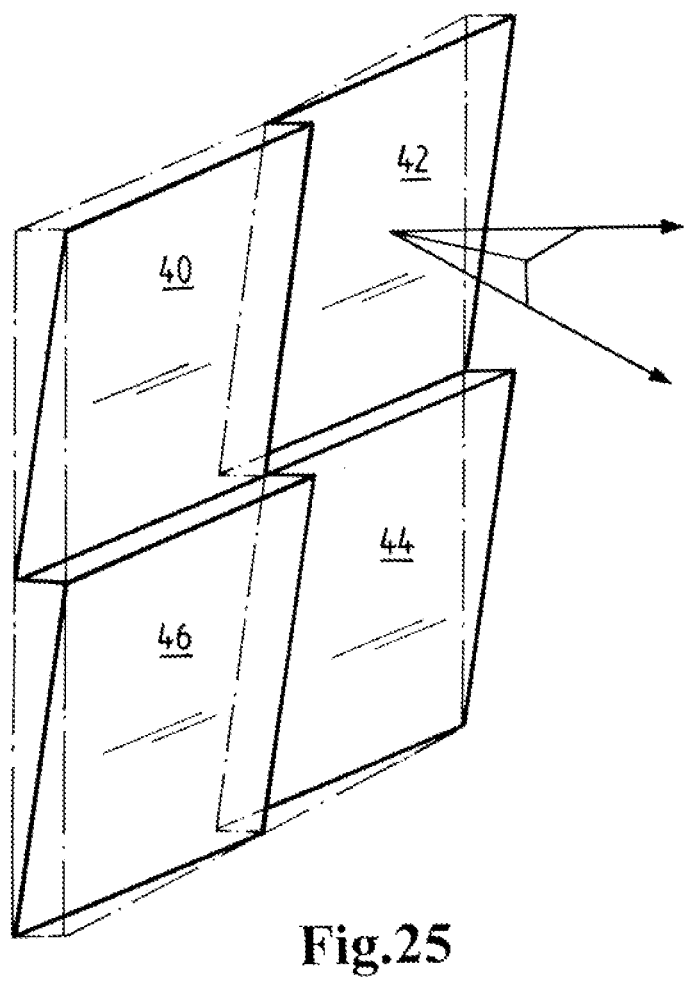
FIG. 25 is a schematic illustration of the slanted arrangement of the four reference surfaces of the cyclone separators illustrated in FIGS. 1 to 24.

For avoiding unnecessary repetitions, the following explanations with regard to configurations, features, and advantages of the present invention (if nothing to the contrary is indicated) apply to the cyclone separator 100 of FIGS. 1 through 7 as well as to cyclone separator 100' illustrated in FIGS. 8 through 12 as well as to cyclone separator 100" illustrated in FIGS. 13 to 23 and also to the cyclone separator 100''' illustrated in FIG. 24.

In the first embodiment of the present invention illustrated in FIGS. 1 through 7, a cyclone separator 100, i.e., a pre-separator embodied as a multi-cell cyclone for an air filter of an internal combustion engine, is illustrated. This cyclone separator 100 is used for separating liquid and/or solid particles from a gas stream and has a cyclone arrangement with a plurality of individual cyclones. For separating the particles from the gas stream, the individual cyclones each have a substantially cylindrically designed cell tube 10 with a guide device 16, wherein the guide device 16 is designed to cause the gas stream to rotate.

The cell tubes 10 are arranged in rows which extend in vertical direction (Y) and in transverse direction (Z) with respect to the cyclone separator 100. The cell tubes 10 are thus positioned vertically on top of each other as well as adjacent to each other in horizontal direction. Accordingly, the neighboring individual cyclones may be in contact with each other or may be spaced from each other.

Figure 1:
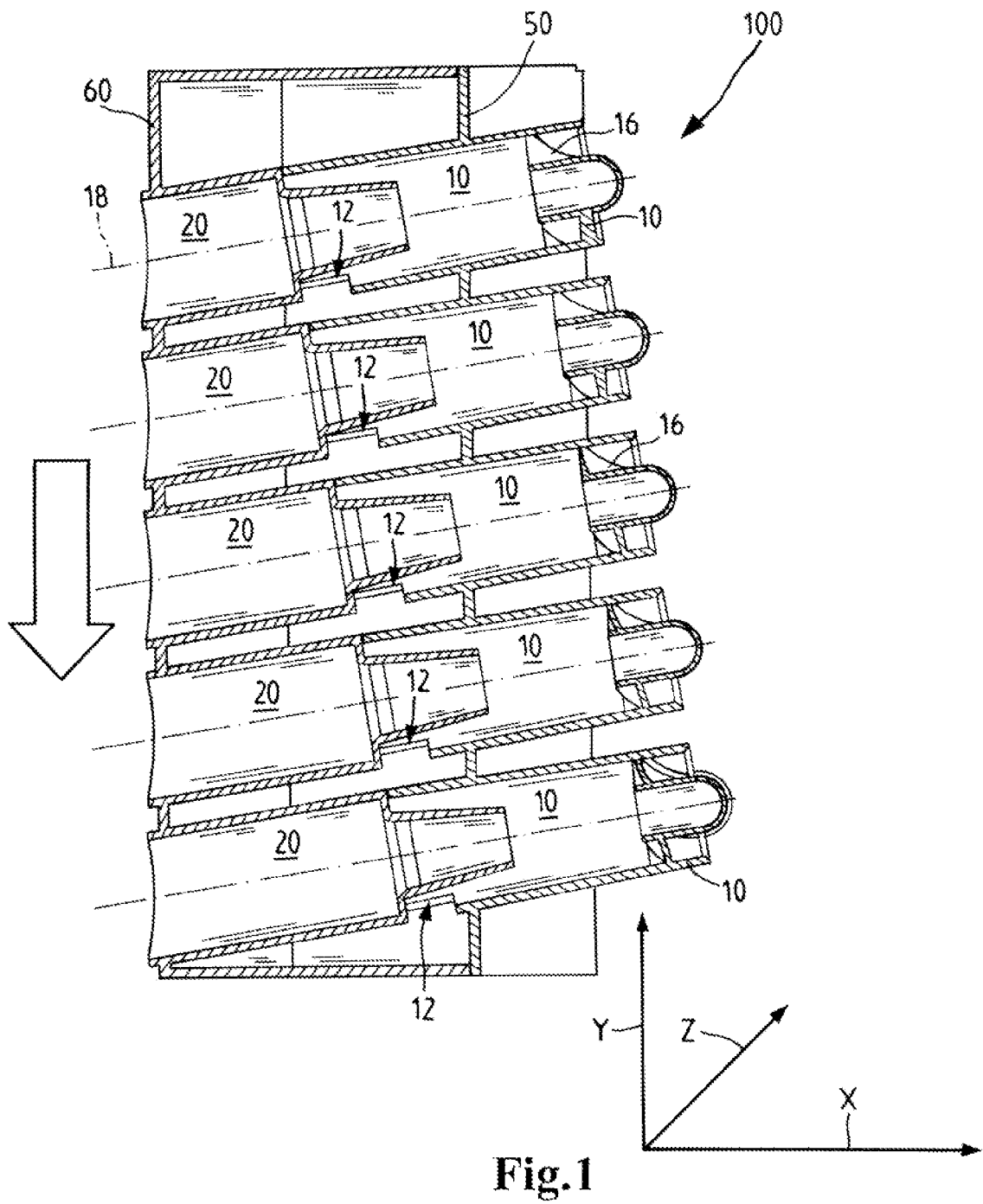
FIG. 1 shows in a section view a first embodiment of a cyclone separator according to the present invention, wherein in this first embodiment the displacement of the particle outlet openings is achieved by a slanted positioning of the cell tubes.
Figure 2:
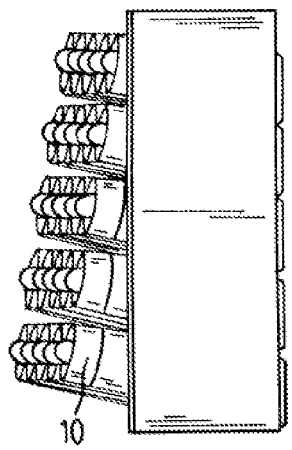
FIG. 2 shows a side view of the cyclone separator of FIG. 1.
Figure 3:
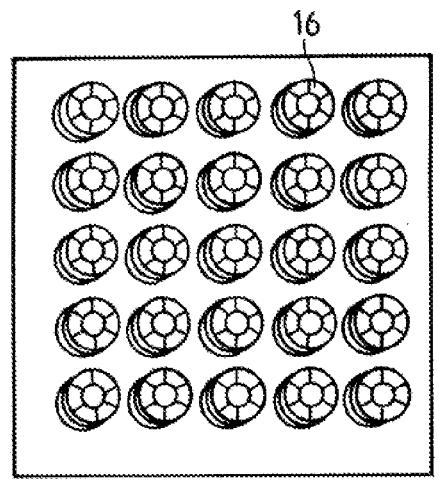
FIG. 3 is a front view of the cyclone separator illustrated in FIGS. 1 through 7.
Figure 4:
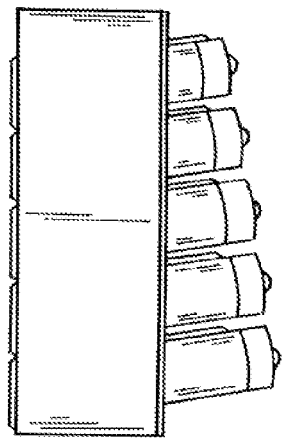
FIG. 4 shows a further side view of the cyclone separator illustrated in FIGS. 1 through 7.
Figure 5:
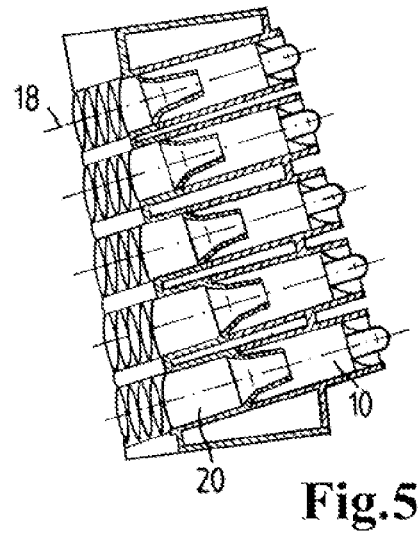
FIG. 5 shows a section view along the line B-B illustrated in FIG. 4 of the cyclone separator illustrated in FIGS. 1 through 7.
Figure 6:
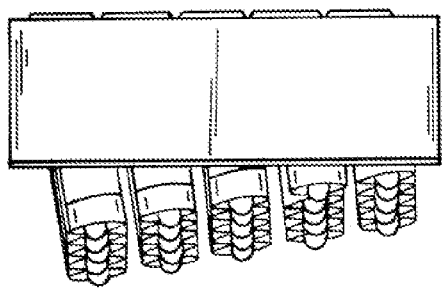
FIG. 6 is a plan view onto the cyclone separator of FIG. 1.
Figure 7:
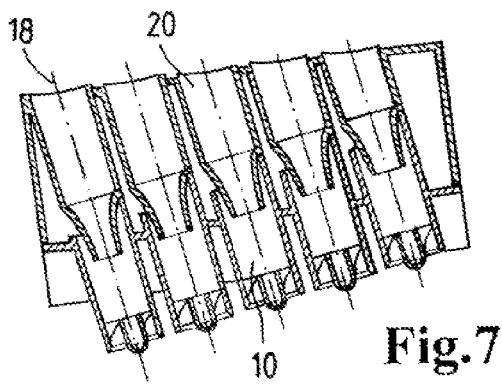
FIG. 7 is a section illustration along the section line A-A illustrated in FIG. 6 of the cyclone separator illustrated in FIGS. 1 through 7.
Figure 8:
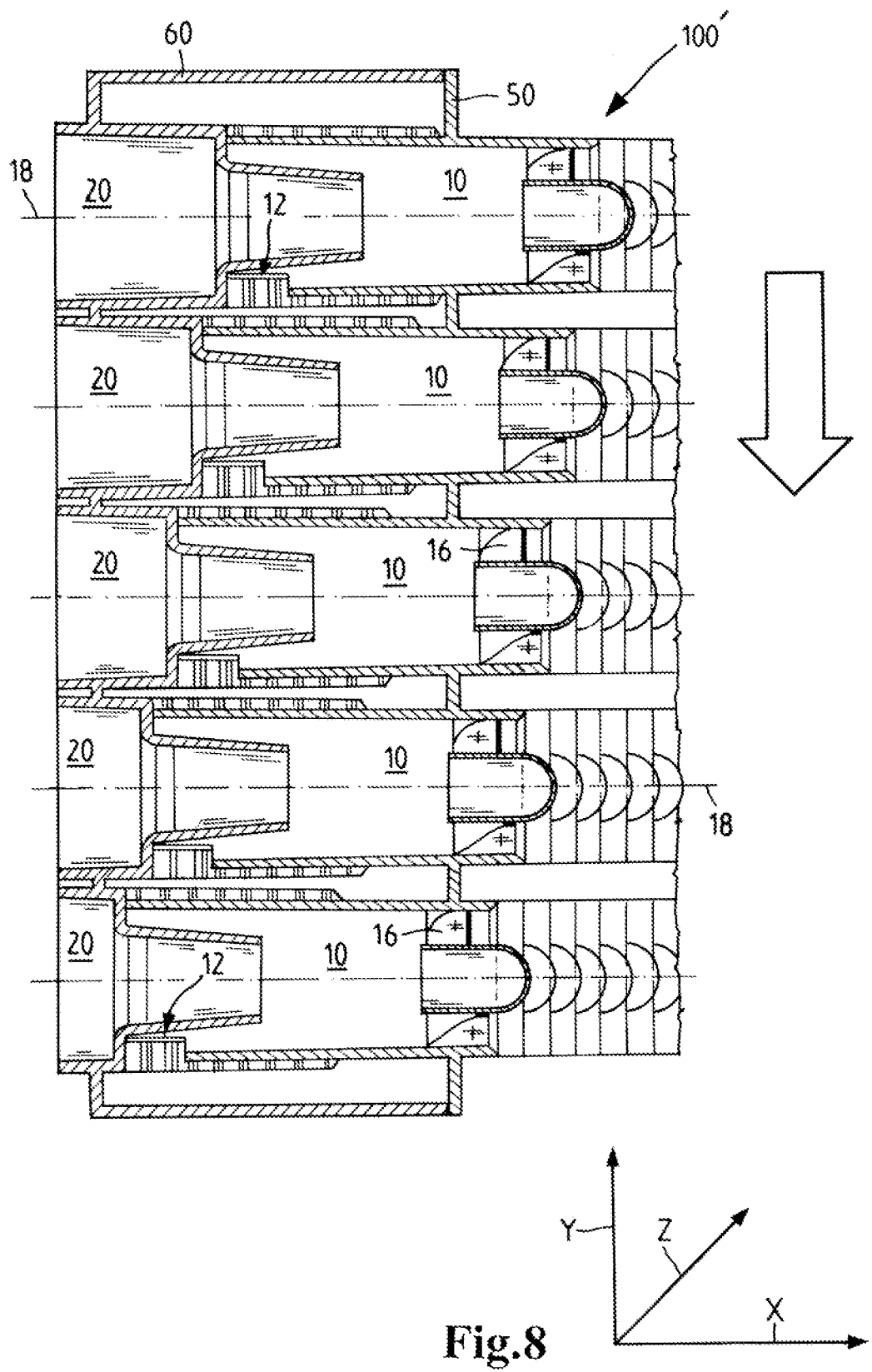
FIG. 8 shows in a section view a second embodiment of a cyclone separator according to the present invention wherein in this second embodiment the displacement of the particle outlet openings is realized by an axial displacement of the cell tubes.
Figure 9:
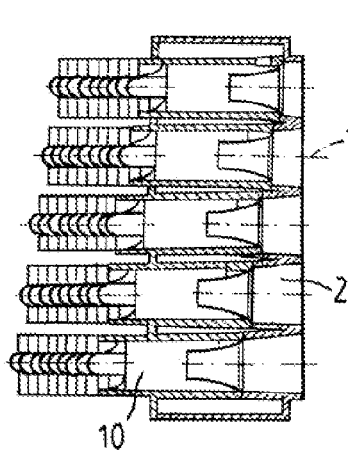
FIG. 9 is a section view along the section line A-A illustrated in FIG. 10 of the cyclone separator of FIG. 8.
Figure 10:
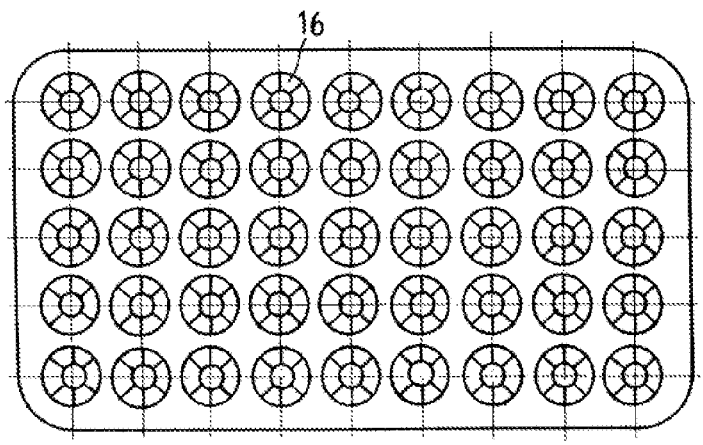
FIG. 10 is a front view of the cyclone separator illustrated in FIGS. 8 to 12.
Figure 11:
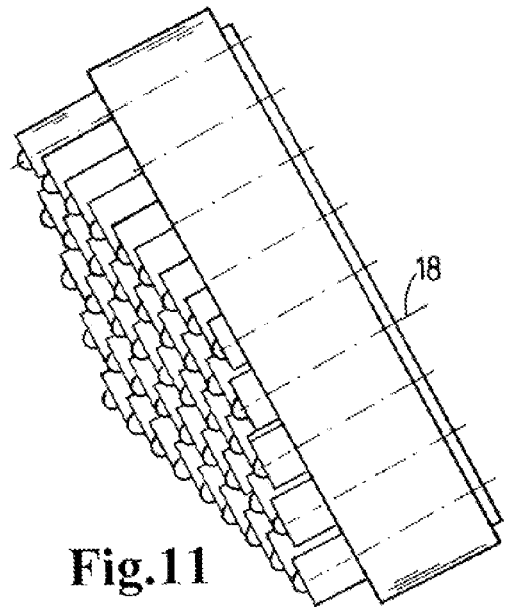
FIG. 11 is a slanted section view along the section line C-C illustrated in FIG. 10 of the cyclone separator illustrated in FIGS. 8 to 12.
Figure 12:
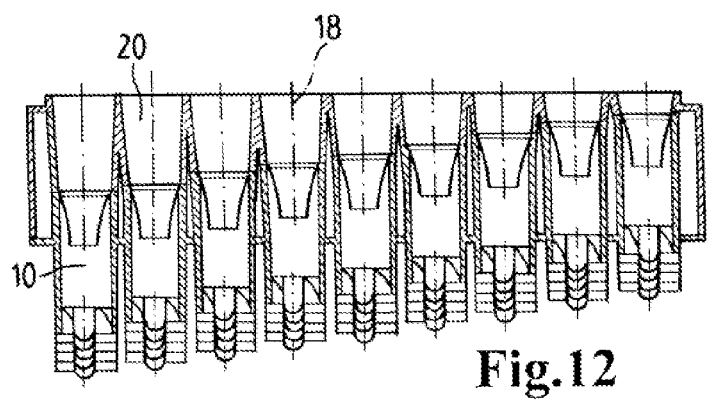
FIG. 12 is a section view of the section line B-B illustrated in FIG. 10 of the cyclone separator illustrated in FIGS. 8 to 12.
Figure 13:
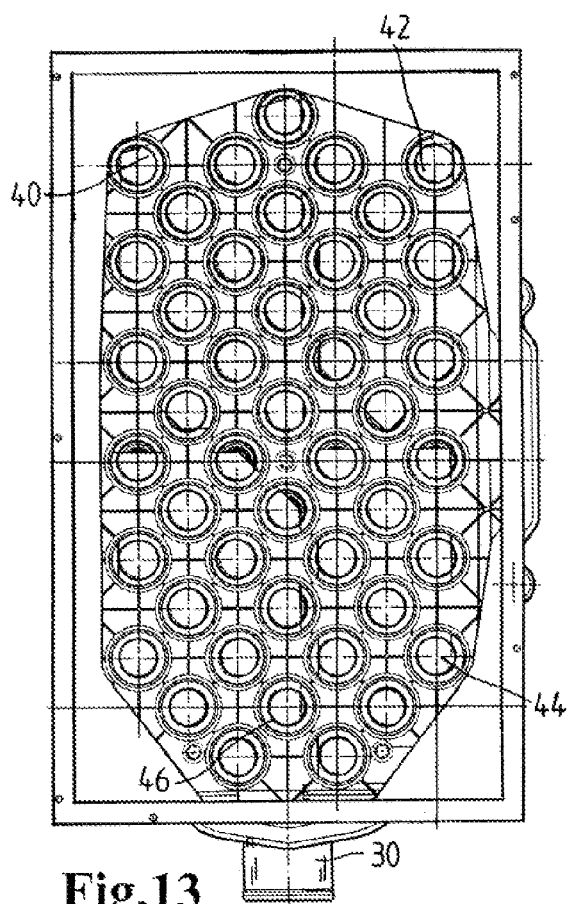
FIG. 13 is a third embodiment of a cyclone separator according to the present invention wherein in this third embodiment the displacement of the particle outlet openings is realized by axial displacement of the cell tubes.
Figure 14:
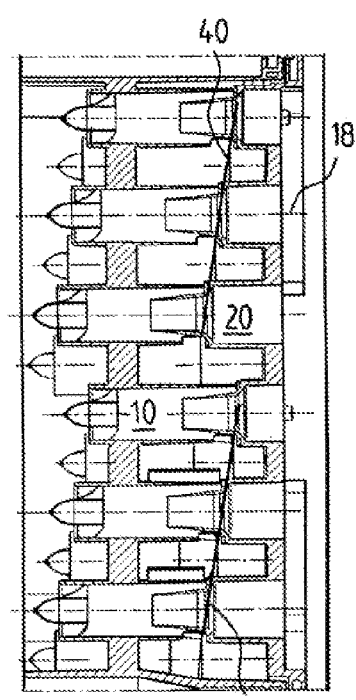
FIG. 14 is a section view along the section line A-A illustrated in FIG. 13 of the cyclone separator illustrated in FIGS. 13 to 22.
Figure 15:
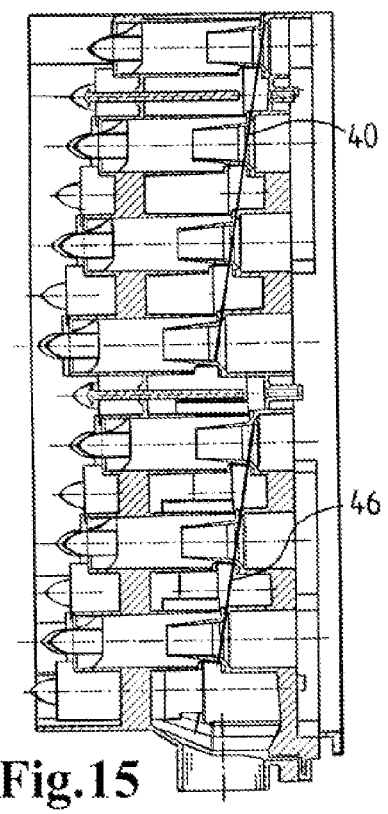
FIG. 15 is a section view along the section line B-B illustrated in FIG. 13 of the cyclone separator illustrated in FIGS. 13 to 23.
Figure 16:
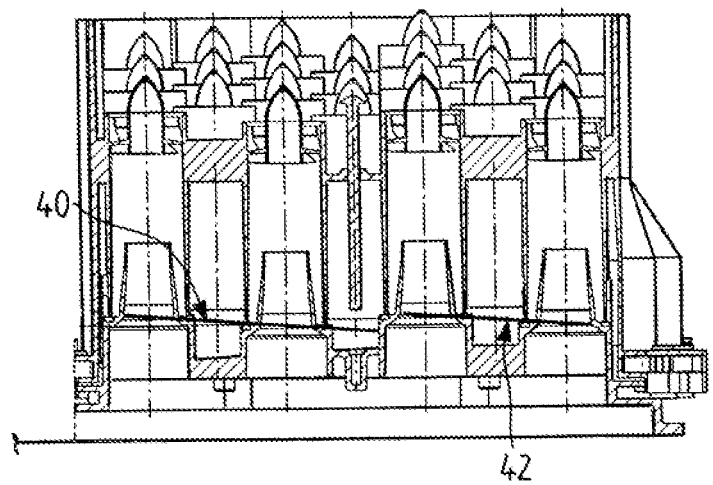
FIG. 16 is a section view along the section line C-C illustrated in FIG. 13 of the cyclone separator illustrated in FIGS. 13 to 23.
Figure 17:
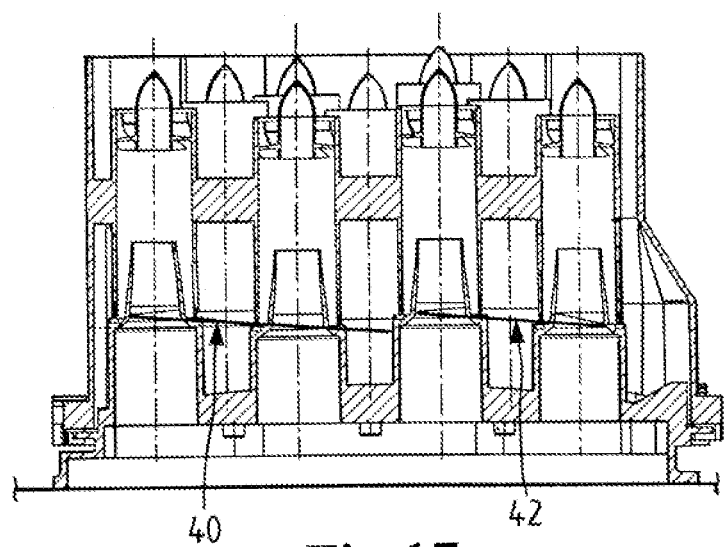
FIG. 17 is a section view along the section line D-D illustrated in FIG. 13 of the cyclone separator illustrated in FIGS. 13 to 23.
Figure 18:
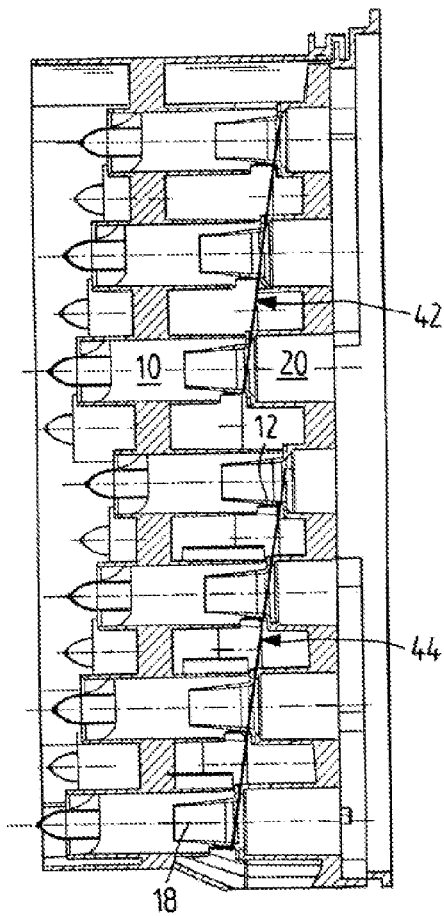
FIG. 18 is a section view along the section line E-E illustrated in FIG. 13 of the cyclone separator illustrated in FIGS. 13 to 23.
Figure 19:
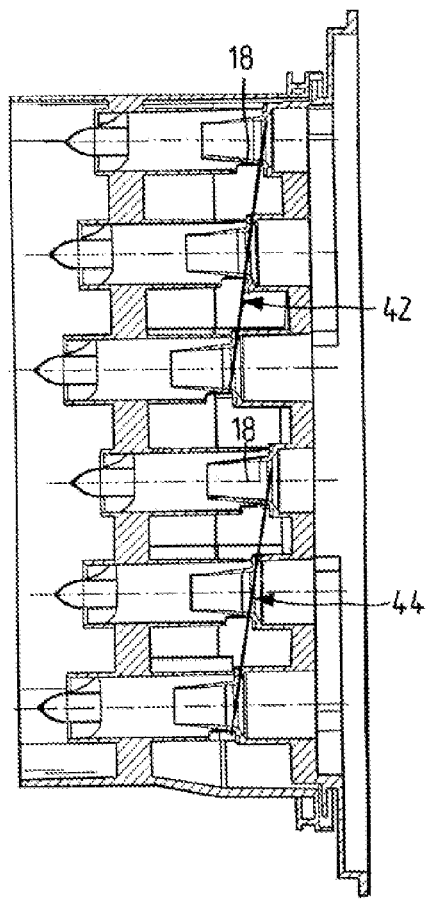
FIG. 19 is a section view along the section line F-F illustrated in FIG. 13 of the cyclone separator illustrated in FIGS. 13 to 23.
Figure 20:
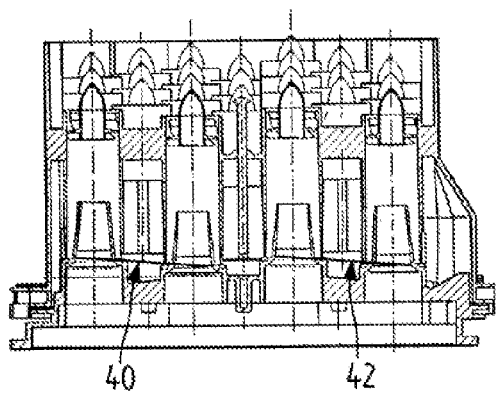
FIG. 20 is a section view along the section line G-G illustrated in FIG. 13 of the cyclone separator illustrated in FIGS. 13 to 23.
Figure 21:
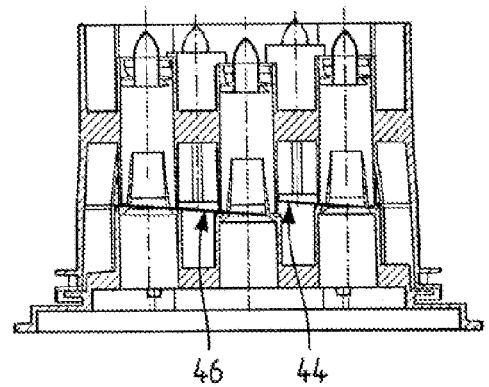
FIG. 21 is a section view along the section line H-H illustrated in FIG. 13 of the cyclone separator illustrated in FIGS. 13 to 23.
Figure 22:
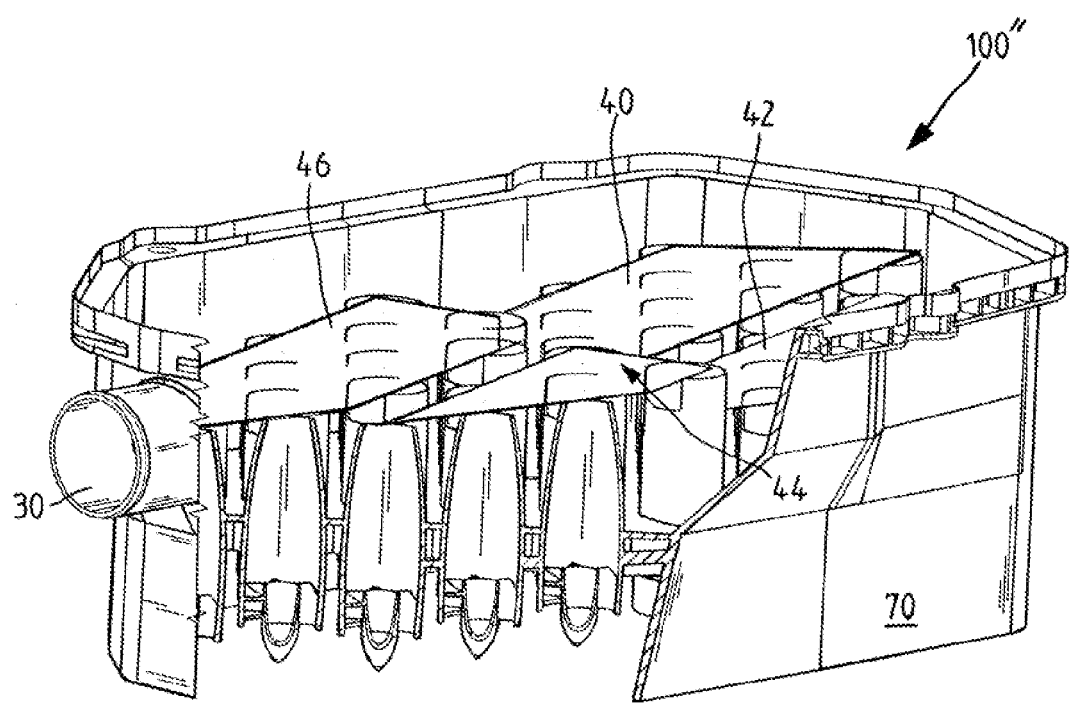
FIG. 22 is an isometric illustration of the cyclone separator illustrated in FIGS. 13 to 23.
Figure 23:
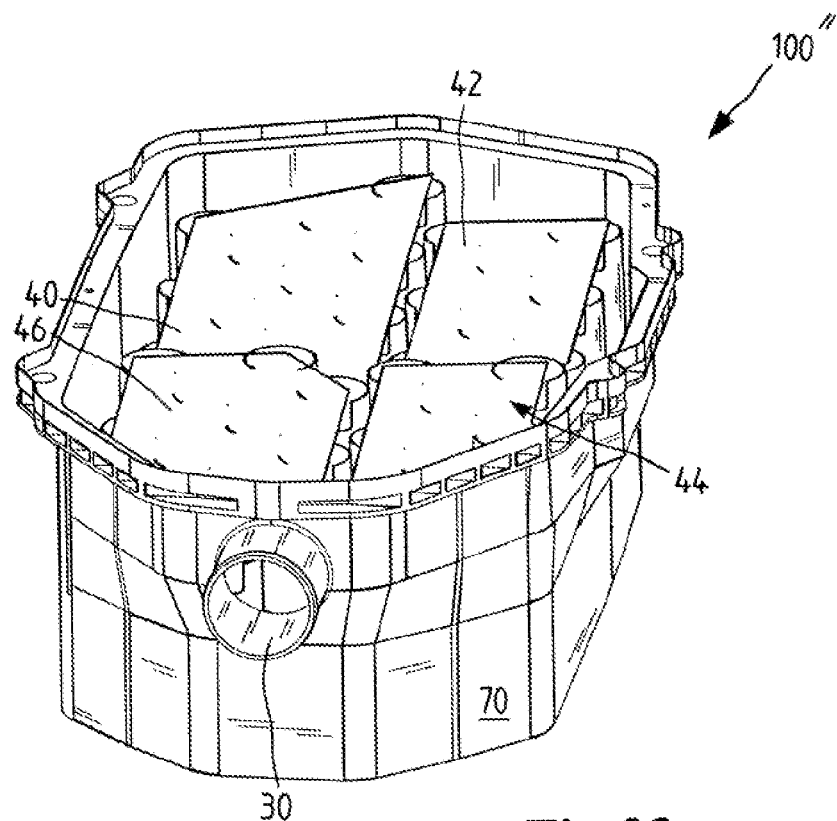
FIG. 23 is a further isometric illustration of the cyclone separator illustrated in FIGS. 13 to 23.

For discharging the separated particles from the cyclone arrangement, i.e., from the arrangement of the individual cyclones, the cyclone separator 100 has at least one particle discharge 30, 32 that is perpendicularly extending relative to the longitudinal axis (X) of the cyclone separator 100. Due to the two particle discharges 30, 32 shown in FIG. 24, the discharge of the particles through the particles outlets 30, 32 can be realized in transverse direction as well as in the direction of length of the cyclone separator. In the position of use, the cyclone separator 100''' of FIG. 24 can thus be arranged transversely as well as upright. As illustrated in FIG. 24, in case of a substantially oval cyclone separator the particle discharge 30, 32 can be positioned on the transverse side (short side) of the cyclone separator as well as on the longitudinal side (long side) of the cyclone separator 100'''. The fall direction of the separated particles is however always downward, which is indicated in FIGS. 1 and 8 by the arrow.

In the cyclone separator 100, the flow direction of the gas stream is substantially along the longitudinal axis (X) of the cyclone separator 100.

For a targeted discharge of the particles that have been separated by rotation from the gas stream to the particle discharge 30, 32, the cell tubes 10 each have at their downstream end at least one particle outlet opening 12 that is facing the particle discharge 30, 32.

The particle outlet openings 12 of the individual cyclones neighboring each other in the direction of the first perpendicular line (Y) that is perpendicular relative to the longitudinal axis (X) of the cyclone separator 100, i.e., the individual cyclones that are stacked on top of each other in the vertical direction of the cyclone arrangement, are arranged with displacement relative to each other in the direction of the longitudinal axis (X) of the cyclone separator 100. Because of the displacement of the particle outlet openings 12 (dust outlet ports), a large accumulation of dust exiting through the dust outlet port is prevented.

As illustrated in FIGS. 13 to 23 and 25, the cell tubes 10 are associated with a plurality of segments. In the present embodiment, the cell tubes 10 are associated with four segments wherein the cells relative to each other have an axial displacement and are arranged within a segment along a reference surface 40, 42, 44, 46, here along of reference plane.

The reference planes 40, 42, 44, 46 are arranged such that an axial displacement is provided for the particle outlet openings 12 arranged on top of each other as well as arranged in the transverse direction of the cyclone separator. In this manner, an improved particle discharge is achieved for both arrangements of the particle discharge 30, 32.

The particle outlet openings or ports 12 of the cell tubes or sockets 10 are each arranged in relation to the position of the particle discharges or discharge sockets 30, 32; this can be achieved in the production process by exchangeable inserts in the cyclone (top) mold.

Preferably, the particle outlet openings 12 in the vertical direction (Y) and/or in the transverse direction (Z) of the cyclone separator are displaced the farther axially, for example axially rearwardly, the farther they are removed from the particle discharges 30, 32. Preferably, the slant of the reference surfaces 40, 42, 44, 46 in the longitudinal direction of the cyclone separator 100" is more pronounced than in the transverse direction of the cyclone separator 100" because in a position of use of the cyclone separator 100" in the longitudinal direction there are more individual cyclones in the fall direction of the separated particles than in the position of use of the cyclone separator 100" in the transverse direction.

In the first embodiment of the cyclone separator 100 illustrated in FIGS. 1 through 7, the displacement of the particle outlet openings 12 is achieved by a slanted positioning of the cell tubes 10; in this context, the cell tubes 10, as shown, end in a common plane.

The particle discharge 30, 32 (compare FIGS. 13, 22, 23 and 24) is arranged in a housing 70 (compare FIGS. 22 and 23) of the cyclone separator 100. The displacement of the particle outlet openings 12 of the individual cyclones that are neighboring each other in the direction of the first perpendicular line (Y) and/or the particle outlet openings 12 of the individual cyclones that are neighboring each other in the direction of the second perpendicular line (Z) is realized in the first embodiment of FIGS. 1 through 7 by a slanted positioning of the longitudinal axis of the individual cyclones relative to the longitudinal axis of the housing of the cyclone separator 100.

In the second embodiment of the cyclone separator 100' illustrated in FIGS. 8 through 12 and in the third embodiment of the cyclone separator 100" illustrated in FIGS. 13 to 24, the displacement of the particle outlet openings 12 is realized by an axial displacement of the cell tubes 10. This has the advantage of improved producibility. Moreover, the cell tubes 10 can also be displaced alternatingly; this is particularly advantageous for large cyclone separators with a plurality of individual cyclones.

In the third embodiment of the cyclone separator 100" illustrated in FIGS. 13 to 24, the cell tubes 10 in the position of use of the cyclone separator are arranged in rows that are positioned substantially at a 45 degree angle relative to the vertical direction Y and to the transverse direction Z of the cyclone separator 100". In the front view (compare FIG. 13) of the cyclone separator 100", the cell tubes 10 are also arranged in rows which are slanted approximately 45 degrees relative to the ordinate axis Y. In other words, the cell tubes 10 with respect to the discharge direction of the particles (compare arrow in FIG. 1 and FIG. 8) are arranged in a diamond shape. This arrangement of the cell tubes 10 in rows which are positioned approximately at 45 degrees relative to the first perpendicular line Y has the advantage that in the position of use of the cyclone separator 100″ the cell tubes 10 arranged underneath each other are spaced from each other. By arranging the cell tubes 10 that are on top of each other in the position of use of the cyclone separator 100″ such that they are not in the densest packing but at a spacing relative to each other, an improved particle discharge from the cyclone separator 100′ is achieved in comparison to cell tubes 10 arranged in vertical rows because an accumulation of separated particles between two cell tubes 10 and thus clogging of the cell tubes 10 is avoided.

While specific embodiments of the invention have been shown and described in detail to illustrate the inventive principles, it will be understood that the invention may be embodied otherwise without departing from such principles.

What is claimed is:

1. A cyclone separator for separating liquid and/or solid particles from a gas stream, the cyclone separator comprising:
    a cyclone arrangement in the cyclone separator with individual cyclones each comprising a cell tube with a guide device, wherein the guide device is designed such that a gas stream passing through the cell tube in a flow direction of the gas stream is caused to rotate;
    a particle discharge on the cyclone separator positioned perpendicularly to a longitudinal axis of the cyclone separator and adapted to discharge separated particles that have been separated from the gas stream by rotation in the cyclone arrangement, wherein the cell tubes, for a targeted discharge of the separated particles to the particle discharge, each have at least one particle outlet opening that is facing the particle discharge;
    wherein the particle outlet openings of at least some of the individual cyclones, neighboring each other in the direction of a first perpendicular line that is perpendicular relative to the longitudinal axis of the cyclone separator, are displaced relative to each other in a direction of the longitudinal axis of the cyclone separator such that particles ejected from the particle outlet openings of individual cyclones will be guided into different planes offset relative to the longitudinal axis;
    wherein a first subset of the individual cyclones is a plurality of cyclones having particle outlet openings arranged at a first location on the longitudinal axis of the cyclone separator; and
    a second subset of the individual cyclones is a plurality of cyclones having particle outlet openings arranged at a second location on the longitudinal axis of the cyclone separator, the second location offset from the first location along the longitudinal axis of the cyclone separator;
    wherein individual cyclones of the first and second subset are alternately arranged such that individual cyclones of the first subset are immediately neighbored by individual cyclones of the second subset such that the particle outlet openings of the individual cyclones neighboring each other in the direction of the first perpendicular line and/or the particle outlet openings of the individual cyclones neighboring each other in the direction of the second perpendicular line are displaced from each other alternatingly; a first cyclone component and a second cyclone component arranged downstream in the flow direction of the gas stream relative to the first cyclone component, wherein the cell tubes are associated with the first cyclone component and the second cyclone component comprises immersion tubes, wherein the immersion tubes have a central outlet arranged downstream in the flow direction of the gas stream for discharging the purified gas stream, wherein the immersion tubes are disposed in the cell tubes, respectively, wherein the immersion tubes each have a downstream end in the flow direction of the gas stream and the cell tubes each have a downstream end in the flow direction of the gas stream, wherein the downstream ends of the immersion tubes are connected at least partially with the downstream ends of the cell tubes, respectively.

2. The cyclone separator according to claim 1, wherein the individual cyclones that in a vertical direction of the cyclone arrangement are arranged on top of each other are displaced relative to each other in the direction of the longitudinal axis of the cyclone separator.

3. The cyclone separator according to claim 1, wherein the displacement of the particle outlet openings in the direction of the longitudinal axis of the cyclone separator is realized by slanted positioning of the longitudinal axis of the cell tubes relative to the longitudinal axis of the cyclone separator.

4. The cyclone separator according to claim 1, wherein a magnitude of the displacement of the particle outlet openings in the direction of the longitudinal axis of the cyclone separator is selected as a function of the number of the individual cyclones neighboring each other and/or a distance of the particle discharge opening relative to the particle discharge.

5. The cyclone separator according to claim 1 as a pre-separator of an air filter system for an internal combustion engine of a vehicle.

6. The cyclone separator according to claim 1 as a pre-separator of an air filter system for an internal combustion engine of an agricultural machine or a truck.

7. The cyclone separator according to claim 1, wherein the particle outlet openings of at least some of the individual cyclones neighboring each other in a direction of a second perpendicular line are displaced relative to each other in the direction of the longitudinal axis of the cyclone separator,
    wherein the second perpendicular line is arranged perpendicularly relative to the longitudinal axis of the cyclone separator and perpendicularly relative to the first perpendicular line.

8. The cyclone separator according to claim 7, wherein the second perpendicular line is extending in a transverse direction of the cyclone arrangement.

9. The cyclone separator according to claim 1, wherein a longitudinal axis of the cell tubes is arranged parallel to the longitudinal axis of the cyclone separator and the displacement of the particle outlet openings in the direction of the longitudinal axis of the cyclone separator is realized by a displacement of the particle outlet openings in the direction of the longitudinal axis of the cell tubes.

10. The cyclone separator according to claim 9, wherein the displacement of the particle outlet openings in the direction of the longitudinal axis of the cell tubes is realized by a different length of the neighboring cell tubes or by an axial displacement of the individual cell tubes relative to each other.

11. A cyclone separator for separating liquid and/or solid particles from a gas stream, the cyclone separator comprising:
    a cyclone arrangement in the cyclone separator with individual cyclones each comprising a cell tube with a guide device, wherein the guide device is designed such that a gas stream passing through the cell tube in a flow direction of the gas stream is caused to rotate;
    a particle discharge on the cyclone separator positioned perpendicularly to a longitudinal axis of the cyclone separator and adapted to discharge separated particles that have been separated from the gas stream by rotation in the cyclone arrangement, wherein the cell tubes, for a targeted discharge of the separated particles to the particle discharge, each have at least one particle outlet opening that is facing the particle discharge;

wherein the particle outlet openings of at least some of the individual cyclones, neighboring each other in the direction of a first perpendicular line that is perpendicular relative to the longitudinal axis of the cyclone separator, are displaced relative to each other in a direction of the longitudinal axis of the cyclone separator such that particles ejected from the particle outlet openings of individual cyclones will be guided into different planes offset relative to the longitudinal axis;

wherein the individual cyclones are associated with at least two segments, wherein the individual cyclones are arranged within one segment along a reference surface, respectively;

a first subset of the individual cyclones is a plurality of cyclones having particle outlet openings arranged within a first segment along a first planar reference surface;

a second subset of the individual cyclones is a plurality of cyclones having particle outlet openings arranged within a second segment along a second planar reference surface, the second planar reference surface offset from the first planar reference surface in the direction of the longitudinal axis of the cyclone separator;

wherein individual cyclones of each segment are arranged such that particles ejected from the particle outlet openings of the individual cyclones will be guided into different planes relative to the longitudinal axis;

wherein the reference surface is a reference plane or a spherical reference surface a first cyclone component and a second cyclone component arranged downstream in the flow direction of the gas stream relative to the first cyclone component, wherein the cell tubes are associated with the first cyclone component and the second cyclone component comprises immersion tubes, wherein the immersion tubes have a central outlet arranged downstream in the flow direction of the gas stream for discharging the purified gas stream, wherein the immersion tubes are disposed in the cell tubes, respectively, wherein the immersion tubes each have a downstream end in the flow direction of the gas stream and the cell tubes each have a downstream end in the flow direction of the gas stream, wherein the downstream ends of the immersion tubes are connected at least partially with the downstream ends of the cell tubes, respectively.

12. The cyclone separator according to claim 11, wherein the individual cyclones each have downstream ends in the flow direction of the gas stream, wherein the downstream ends of at least some of the individual cyclones that are neighboring each other in the direction of the first perpendicular line and/or the downstream ends of at least some of the individual cyclones that are neighboring each other in the direction of the second perpendicular line are displaced relative to each other in the direction of the longitudinal axis of the cyclone separator.

* * * * *